(12) United States Patent
Natarius

(10) Patent No.: US 6,632,370 B2
(45) Date of Patent: Oct. 14, 2003

(54) METHOD FOR ENTRAINING AND MIXING GAS WITH LIQUIDS

(75) Inventor: Eugene M. Natarius, St. Paul, MN (US)

(73) Assignee: Vortex Flow, Inc., St. Paul, MN (US)

( * ) Notice: Subject to any disclaimer, the term of this patent is extended or adjusted under 35 U.S.C. 154(b) by 115 days.

(21) Appl. No.: 10/041,260

(22) Filed: Jan. 8, 2002

(65) Prior Publication Data

US 2002/0053287 A1 May 9, 2002

Related U.S. Application Data

(63) Continuation-in-part of application No. 09/561,999, filed on May 1, 2000, now Pat. No. 6,419,843.
(60) Provisional application No. 60/135,476, filed on May 24, 1999.

(51) Int. Cl.[7] ............................ B01D 21/26; C02F 1/72; E03F 5/00
(52) U.S. Cl. ..................... 210/788; 210/787; 210/800; 210/806; 210/170; 210/304; 55/459.3; 95/269; 95/271
(58) Field of Search ................................ 210/170, 304, 210/787, 512.1, 788, 800, 806; 55/459.1, 459.3; 95/269, 271

(56) References Cited

U.S. PATENT DOCUMENTS 5,575,909 A    11/1996   Foster

OTHER PUBLICATIONS

D.K.B. Thistlethwayte, "The Control of Sulfides in Sewage Systems," Ann Arbor Sciense Publishers Inc., Ann Arbor, Michigan, 1972 (pp. 94–106).

*Primary Examiner*—David A. Reifsnyder
(74) *Attorney, Agent, or Firm*—Kurt J. Niederluecke; Briggs and Morgan, P.A.

(57) ABSTRACT

A method for entraining and mixing gas with liquids within a conduit or drop structure, comprising the channeling of one or more liquid flows into spiral flows of predetermined radius (radii), reducing the predetermined radius (radii) to increase the centrifugal forces acting upon the spiral flow(s) as the spiral flow(s) enter the conduit, and allowing gas access to the conduit to mix with and entrain within the spiral flow within the conduit or drop structure. The method can facilitate the mixing of gas with one or more fluid flows and/or reduce the release of gas emissions from the fluid(s) into the surrounding environment.

14 Claims, 7 Drawing Sheets

METHOD FOR ENTRAINING AND MIXING GAS WITH LIQUIDS

This application claims the benefit of U.S. patent application Ser. No. 09/561,999 filed May 1, 2000, now U.S. Pat. No. 6,419,843 which claimed the benefit of provisional patent application No. 60/135,476 filed May 24, 1999.

FIELD OF USE

The invention relates generally to applications whereby it is desirous to introduce or reintroduce gas with liquid flowing through pipes, and/or mix two fluids within a pipe. In particular, this method can be used, but is not so limited, to mix and entrain air and other odorous gas emissions into sewage to reduce odorous gas emissions and to reduce hydrogen sulfide corrosion and abrasive wear in waste water conveyance, collection and treatment systems.

BACKGROUND OF THE INVENTION

Throughout past decades, sewers have been utilized to efficiently transport waste water or sewage from locations where it was generated to waste water treatment plants and other destinations. These sewers consist generally of pipelines locate below ground level and oriented with a slight downward grade in the direction of the sewage flow. Gravity acts upon the sewage to cause it to flow within the pipelines toward its ultimate destination. These pipelines are sometimes interconnected by "drop structures" that allow the sewage to flow from one line into the drop structure, drop vertically therewithin, and then to flow out of the drop structure into additional pipes or other structures.

One problem that occurs during the transport of sewage is the release of sulfides from the sewage. Sulfides form as a result of bacterial reduction of sulfates within the sewage in an anaerobic environment. As sewage ages, the level of sulfides increases. Drop structures within a sewer system can provide a beneficial aeration of the sewage flow by introducing additional dissolved oxygen into the flow. The dissolved oxygen reacts with the sulfides, resulting in less chemical volatility in the sewage. This aeration is particularly beneficial where the sewage is fresh and contains a relatively small amount of dissolved sulfides, such as hydrogen sulfide ($H_2S$).

Unfortunately, in most practical applications, sewage contains a significant amount of potentially volatile dissolved molecular hydrogen sulfide gas. Turbulence within the sewage flow can cause this dissolved gas to be released into the surrounding air. Significant sources of turbulence in sewage flow, and hence the emission of hydrogen sulfide gas in a sewer, occur in drop structures such as interceptor drop maintenance holes, joint structures, forcemain discharges and wet well drops in sewer pumping stations. Thus, while drop structures can reintroduce dissolved oxygen into the sewage flow, lowering the level of hydrogen sulfide gas, they can also cause the release of hydrogen sulfide gas. The hydrogen sulfide emissions often cause corrosion with the drop structures and adjacent sewer lines, and cause odor problems even the most elegant, pristine neighborhoods.

One known type of drop structure comprises an influent line, a maintenance hole and an effluent line. The influent line runs almost horizontally at a relatively shallow depth below the ground surface in the form of a pipe. The maintenance hole is located below the street level maintenance hole manhole cover. The maintenance hole is generally cylindrical in shape with a vertical longitudinal axis. The effluent line is another almost horizontal pipe that exits slightly above the bottom of the maintenance hole. Turbulent waste water flow is created when the sewage, which has a substantial amount of potential energy, exits from the influent line near the top of the maintenance hole and tumbles down like a waterfall to the side wall and base of the maintenance hole. Then the sewage pools and eventually flows out the effluent line. This turbulent action releases hydrogen sulfide gas into the air. To reduce the problem of gas release, while still allowing beneficial aeration of the sewage, the potential and kinetic energy in the sewage must be dissipated.

One known method is to create a wall hugging spiral flow down the maintenance hole to dissipate the energy by friction. The spiral flow is generated by the insertion of a vortex form connected to the influent line near the top of the maintenance hole. The vortex form is generally helical in shape and is placed directly below the manhole cover near the top of the maintenance hole. The vortex form channels and diverts the flow from its languid state into a spiral flow descending down the cylindrical wall of the maintenance hole. The vortex form can be made of concrete with applied protective coating, or made of a noncorrosive material, metal or plastic, such as PVC, High Density Polyethylene (HDPE) or other like materials. The vortex form may be manufactured at the factory or on-site.

Two problems remain to be solved when applying this known method of using a vortex form in a drop structure for sewage flows. First, the upstream flow velocities within the influent line are usually not large enough to create a stable spiral flow on the vertical wall of a typical maintenance hole. Thus, the flow, rather than continuing to spiral down the cylindrical wall of the maintenance hole, will generally revert to a turbulent descending flow similar to waterfall, losing the effective energy dissipation of the spiral flow and releasing significant amounts of hydrogen sulfide gas into the air. Second, quite often the maintenance hole is used for additional lateral influent connections at elevations lower than the main influent pipe. Consequently, the lateral influent connections disrupt the spiral flow and create a turbulent waterfall of sewage to the bottom of the maintenance hole, again releasing significant amounts of hydrogen sulfide gas into the air. The additional influent pipe may run in any direction, but at a lower depth than the main influent pipe.

SUMMARY OF INVENTION

It, therefore, is an object of this invention to provide a method for reducing gas emissions of a fluid through the entraining and mixing of gas with the liquid.

It is also an object of this invention to provide a method for mixing gas with one or more fluids in a conduit.

Another object of this invention is to provide a method for use in sewer drop structures that significantly reduces odorous gas emissions from the sewer.

A further object of the invention is to reduce hydrogen sulfide corrosion in waste water conveyance, collection and treatment systems.

A benefit of this invention is the improved way in which the method helps to protect conveyance or collection systems from abrasive wear.

Another benefit is the way the invention in particular improves the quality of wastewater by wastewater aeration.

The foregoing objects and benefits of the present invention are provided by a method for reducing gas emission and for entraining and mixing gas with liquids. The method comprises channeling a fluid flow though one or more pipes, introducing the flow from the pipe(s) into a conduit or chamber through the use of spiral flows of predetermined radii, reducing such radii to increase centrifugal forces acting upon the flow, introducing gas into the reduced radius flow and continuing the reduced radius flow within the conduit until the gas is substantially entrained within the flow. This method can be implemented through the use of a maintenance hole and an influent line for carrying liquid to the maintenance hole, a vortex form which accepts the liquid from the influent line, the vortex form comprising a spiral channel of decreasing radius disposed substantially within the maintenance hole, and a conduit also disposed within the maintenance hole and fluidly connected to the vortex form and extending substantially downwardly from the vortex form to a flow exit near the maintenance hole base. The fluid flowing from the influent line enters the vortex form and is channeled by the vortex form into a spiral flow with a radius smaller than the maintenance hole wall radius. The reduction in the radius of the channel outer wall causes the centrifugal forces acting upon the fluid flow to increase, forcing the flow to continue in intimate contact with the outer wall of the channel. The fluid then flows from the reduced radius of the vortex channel into the conduit and, aided by gravity and the flow's acquired rotational velocity, continues its spiral descent towards the maintenance hole base, in substantially intimate contact with the conduit wall. The spiral flow then exits the conduit near the maintenance hole base into an energy dissipating pool.

The method creates an accelerated fluid flow sufficient to create substantial intimate contact with the vortex form and conduit wall throughout the fluid flow's descent in the maintenance hole. This intimate contact creates frictional forces that reduce the kinetic energy of the flow and inhibit turbulent flow. The reduction in turbulent flow in turn reduces the release of gases, including hydrogen sulfide. In addition, the spiral flow in the conduit creates an air core with reduced pressure in the center of the conduit, inhibiting the escape of any hydrogen sulfide gas into the environment and encouraging the reintroduction of any escaped gas back into the spiral flow and the energy dissipating pool.

In another embodiment of the invention, two influent lines may be used to channel the same or separate flows into the same conduit at two different but proximate locations. The influent lines can originate from a single line or from two distinct lines and may contain the same or different fluids. The flows are then introduced into the conduit through reducing-radius vortices in opposing rotational direction.

In certain embodiments of the invention, it may be advantageous to utilize a vortex form channel with a downwardly sloping base sufficient to create an accelerating spiral flow. The method may also utilize a vortex form incorporating an entrance flume designed to accept the fluid flow from the influent line and more gently direct the flow into the vortex channel. This entrance flume may also incorporate a slope to create an accelerating flow into the vortex channel.

The invention also contemplates utilizing in certain applications of the invention various conduit base configurations for allowing the fluid flow to exit the conduit into the energy dissipating pool. These flow exit paths vary based on the desired fluid flow rates, the energy dissipating pool depth, and the existence and configuration of any effluent lines running from the conduit.

While this invention is particular useful in wastewater conveyance systems, it is not so limited, and can be applied to any system where one desires to mix and entrain one or more gases, including air, into one or more fluid flows within a conduit. Additional applications for the present invention include aeration and/or purification of water in wastewater treatment plants, fishery basins, and natural streams, lakes and bays, and heat transfer in power plant cooling basins. This invention may also be applied to mix food and beverage liquids; to mix constituents in pharmaceutical applications, including applications to suspensions and emulsions; and to mix construction materials including insulation materials, fillers, and high-air concentration mortars and concrete. Thus, the particular embodiments discussed below are not exhaustive and are not intended to limit the scope of this invention.

BRIEF DESCRIPTION

Other objects, features, and advantages of the present invention will become more fully apparent from the following detailed description of certain embodiments, the appended claims, and the accompanying drawings in which:

DETAILED DESCRIPTION OF THE INVENTION

Figure 1:
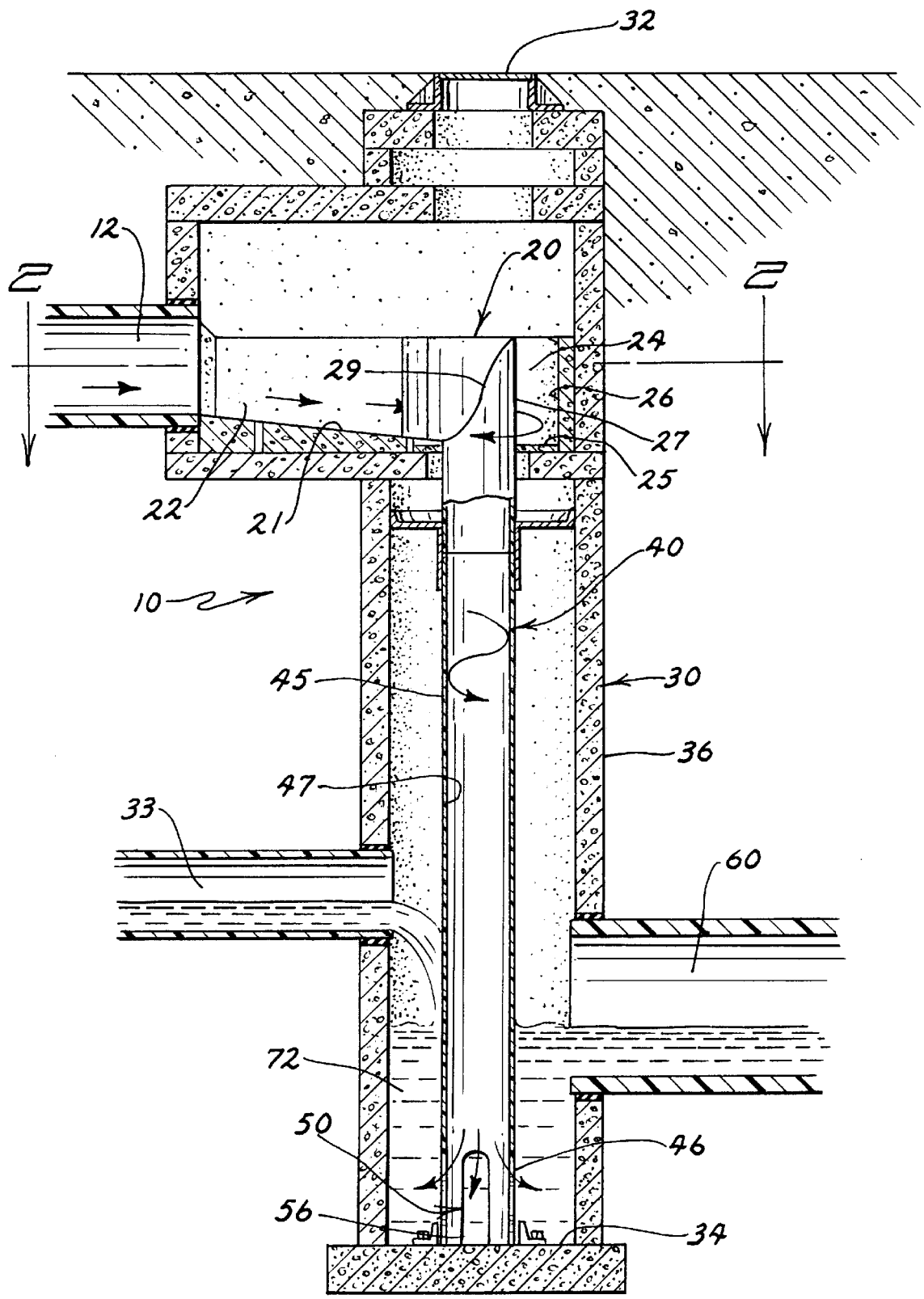
FIG. 1 is a side elevation, cross-sectional, view of one embodiment of the present invention with a portal-type flow exit.

FIG. 1 illustrates in a side elevation view one embodiment of a sewer apparatus 10 constructed in accordance with the present invention. Referring to FIG. 1, the sewer apparatus 10 includes an influent line 12, a vortex form 20, a maintenance hole 30, a conduit 40, a flow exit 50, and an effluent line 60.

The maintenance hole 30 in which the vortex form 20 is disposed may be identified from street level as being below a manhole cover 32. FIG. 1 shows the maintenance hole 30 as being cylindrical in shape and oriented vertically. A lateral line 33 for inputting additional city sewer flowage into the maintenance hole 30 may be disposed below the influent line 12. The base 34 and walls 36 of the maintenance hole 30 are generally concrete. An energy dissipating pool 72, comprised of sewage, forms at the base 34 of the maintenance hole 30. An effluent line 60 is connected to the maintenance hole 30 near the top level of the energy dissipating pool 72.

As illustrated in FIG. 1, sewage flows from the influent line 12 into the vortex form 20 near the top of a maintenance hole 30. The influent line 12 is generally a cylindrical pipe running slightly below the ground surface. To create an accelerated flow of sewage, a portion of the influent line 12 can be set at a predetermined downward sloping orientation.

Figure 3:
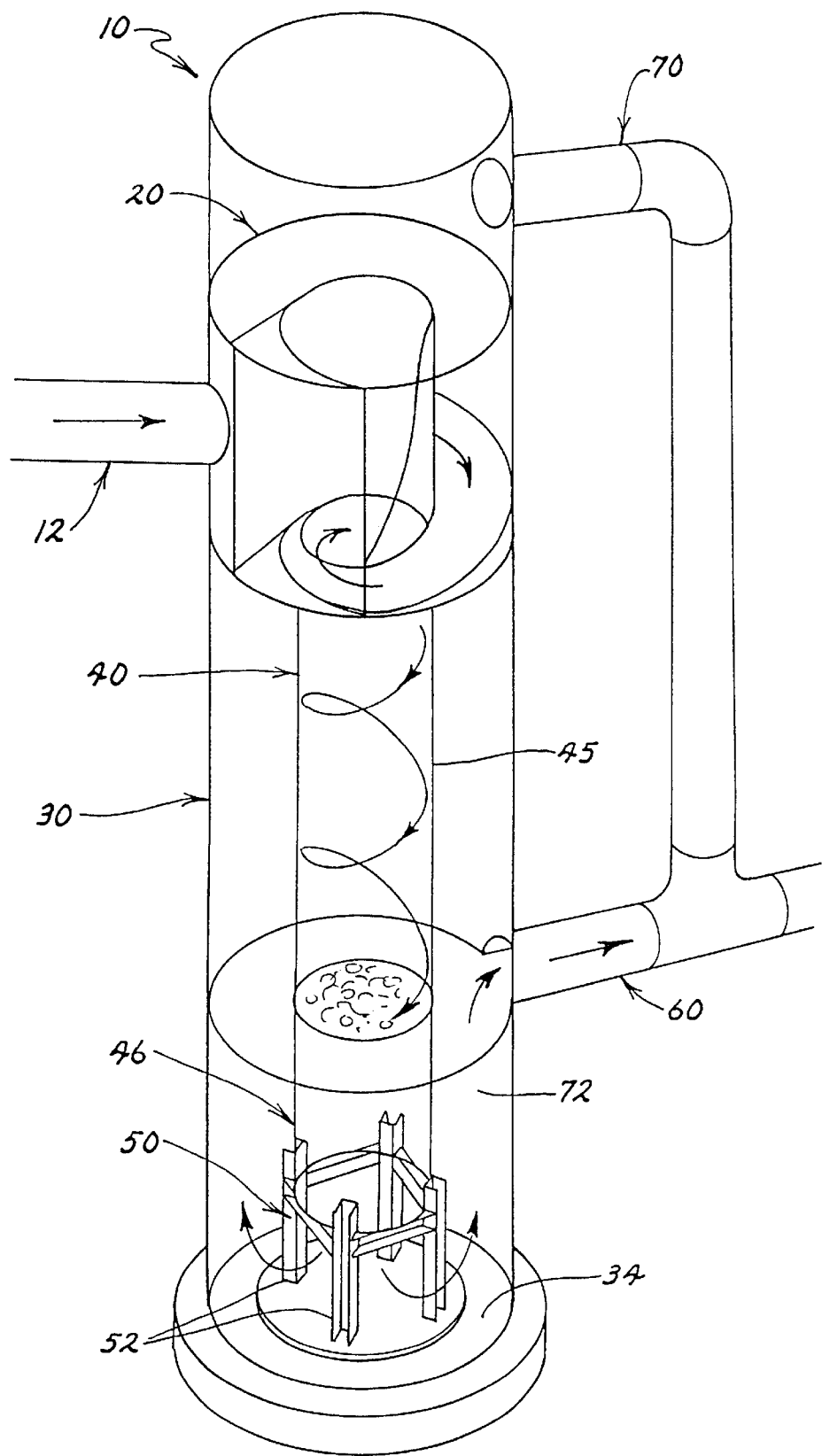
FIG. 3 is perspective view of another embodiment of the present invention with a flow exit comprising a plurality of legs.

Such an orientation is shown in FIG. 3. The slope necessary to create a constant or accelerating velocity is known as the critical or supercritical slope, respectively. A critical slope in which the velocity of the sewage flow would remain constant is identified as having a Froude Number (Fr) equal to one. A supercritical slope in which the sewage flow is accelerating is identified as having a Froude Number greater than one (Fr>1). The Froude Number is calculated using the formula $Fr=V/(g*d)^{1/2}$, where V represents average sewage flow velocity, d represents flow depth and g represents acceleration due to gravity, approximately 32.2 feet per second squared. Each of these factors can effect the critical slope of the influent line 12. While the critical slope will generally occur around one to three percent, it is envisioned that the desired slope could vary anywhere from one percent or more. In the embodiment illustrated in FIG. 3, the influent line 12 descends at a supercritical slope of about ten percent slope to create an accelerated flow.

Figure 2:
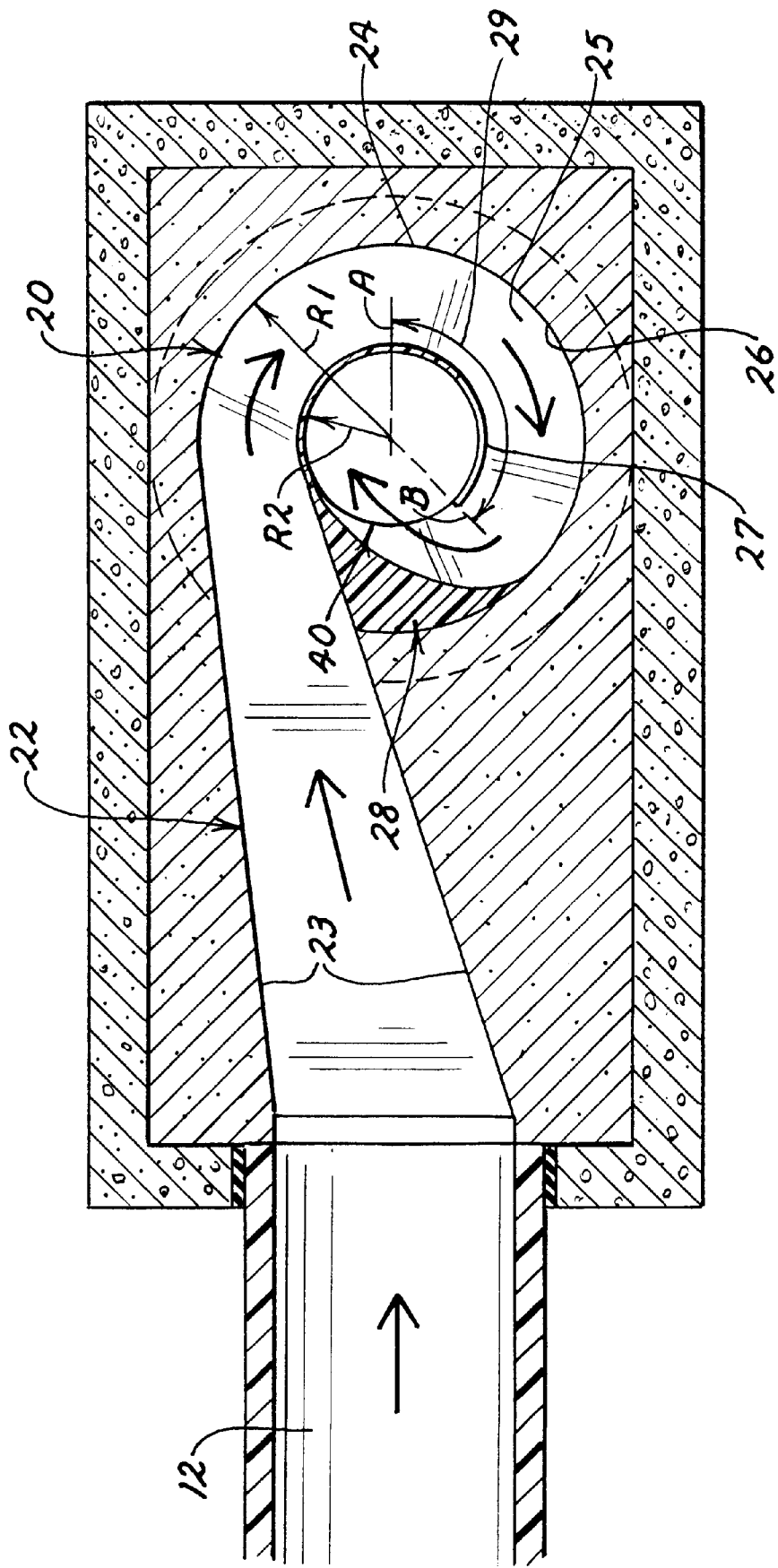
FIG. 2 is the cross-sectional view A—A of the embodiment illustrated in FIG. 1.

Referring again to FIG. 1, the influent line 12 connects to the vortex form 20 and maintenance hole 30 near the top of the maintenance hole 30. The vortex form 20 is disposed within the maintenance hole 30 for receiving the sewage from the influent line 12 and is generally shaped to create a descending spiral flow. FIG. 2 presents the cross-sectional view A—A of FIG. 1, illustrating the vortex form in further detail. Referring to FIG. 2, the vortex form 20 includes a vortex channel 24, and may in certain embodiments also include an entrance flume 22. In the embodiment of the present invention shown in FIG. 1, the entrance flume 22 is fluidly connected to the influent line 12. The entrance flume 22 can take on any shape capable of transporting the sewage from the influent line 12 to the vortex channel 24. In the embodiment illustrated in FIG. 1, the entrance flume 22 consists of a base 21 and side walls 23. The vortex channel 24 is fluidly connected to the entrance flume 22 and comprises a base 25, an outer wall 26, and an inner wall 27. While the specific vortex channel shown utilizes a flat base 25 with substantially vertical side walls 26 and 27, it is envisioned that these structures could take on any shape capable of transporting the sewage in a spiral flow.

Figure 4:
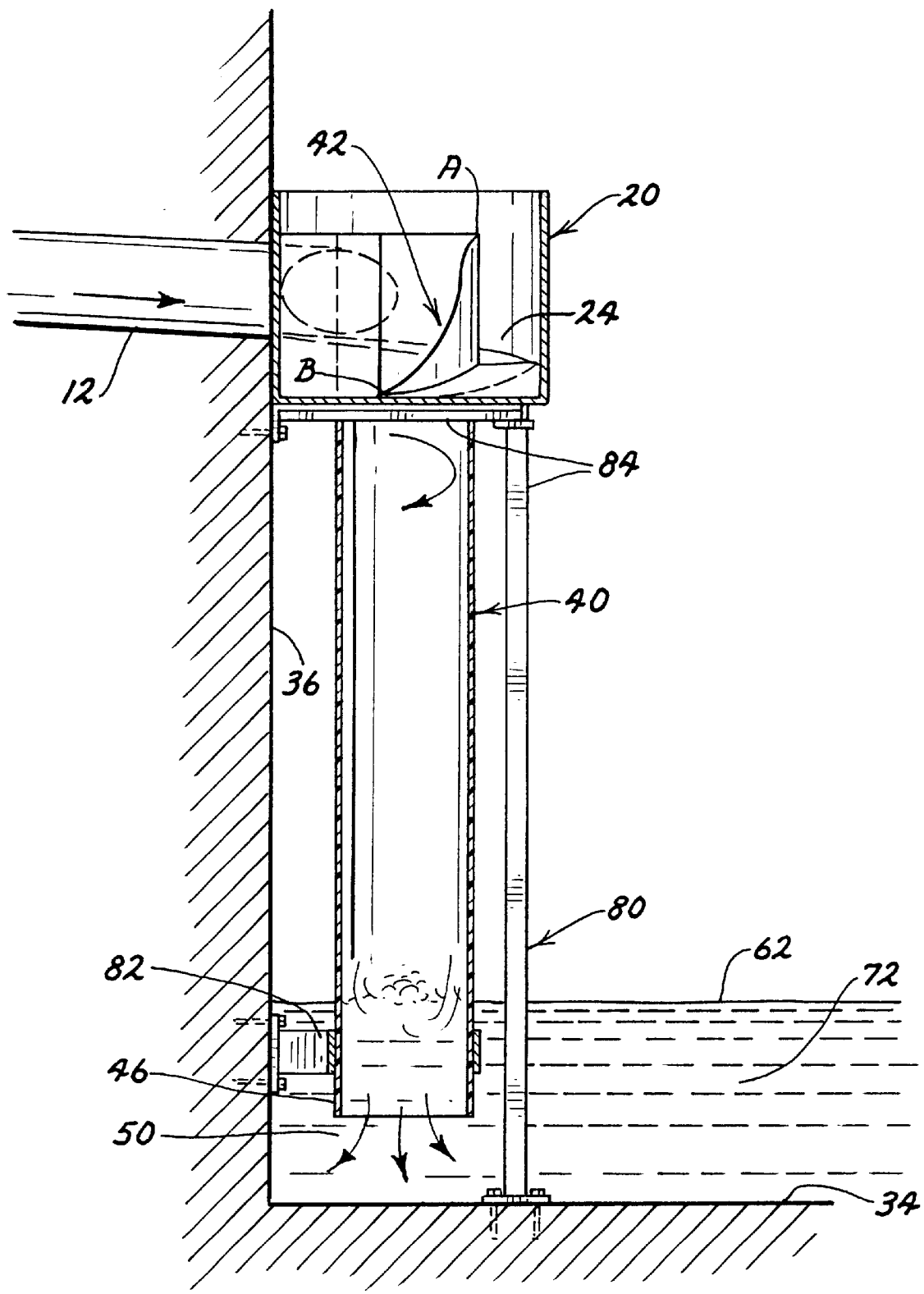
FIG. 4 is a side elevation view of an additional embodiment of the present invention with a suspended flow exit.

The vortex form 20 may be made of concrete with applied protective coating, or made of a noncorrosive material, metal or plastic, such as PVC, High Density Polyethylene (HDPE) or other like materials. The vortex form 20 may be made in advance at the factory or on-site. As shown in FIGS. 3 and 4, the entrance flume 22 and/or vortex channel 24 may be manufactured and oriented with their bases having a supercritical slope, allowing the sewage to accelerate as it flows through the vortex form 20. The selected slopes of the influent line 12, the entrance flume base 21, the vortex channel base 25 will not necessarily be the same. In the embodiment illustrated in FIG. 1, the influent line 12 is substantially horizontal, while the entrance flume base 21 and the vortex channel base 25 have a supercritical slope of about ten percent.

Figure 5:
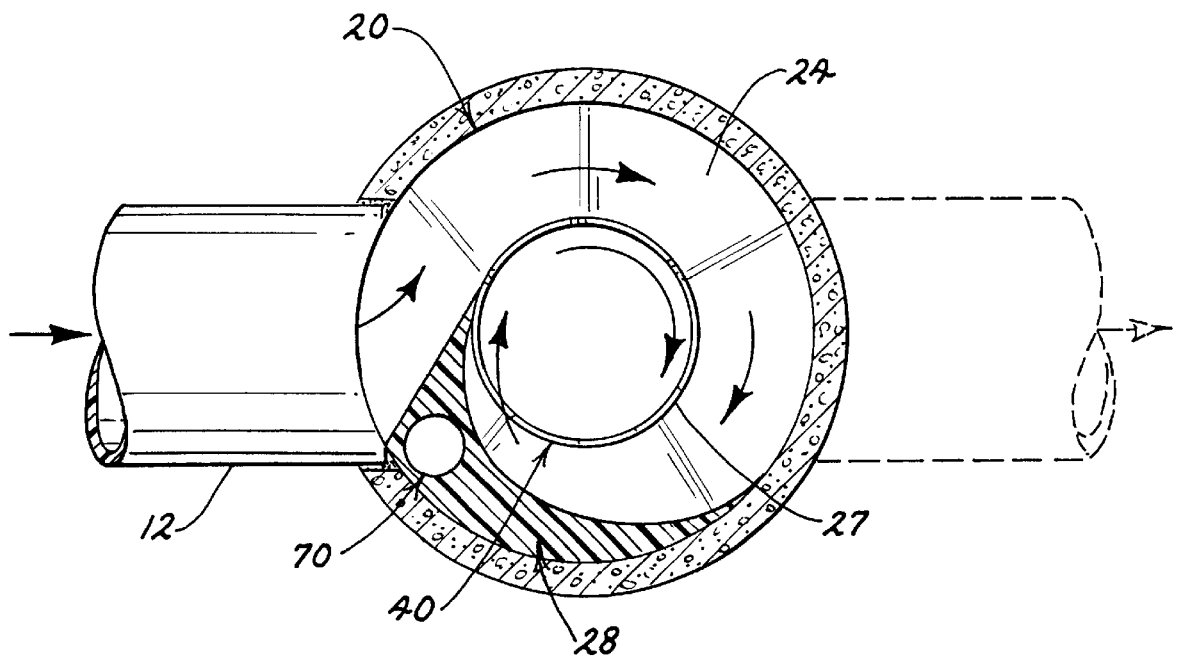
FIG. 5 is a top plan view of a portion of an influent line and a vortex form.

As noted, while the embodiment shown in FIGS. 1 and 2 illustrate a vortex form containing an entrance flume 22, other embodiments of the present invention may fluidly connect the vortex channel 24 directly to the influent line 12, omitting the use of the entrance flume 22. Examples of such embodiments are shown in FIGS. 3, 4, and 5.

Referring to FIG. 2, the vortex channel 24 directs the sewage flow into a substantially spiral flow. The vortex channel 24 also reduces the radius of this spiral flow in order to increase the centripetal forces acting upon the flow. This is accomplished through the reduction in radius of the outer wall 26, which will increase the centripetal forces applied by the outer wall 26 on the spiral flow. In the embodiment shown in FIG. 2, a radius transition section 28 supports the outer wall 26 and reduces the radius of the spiral flow created by the vortex channel 24 (shown in FIG. 2 as R1) to the radius of the conduit 40 (shown as R2). The radius transition section 28 also aids in directing the flow from the vortex channel 24 into the conduit 40. The radius transition section 28 is generally made of a noncorrosive metal or plastic with concrete or a foam fill material.

Figure 6:
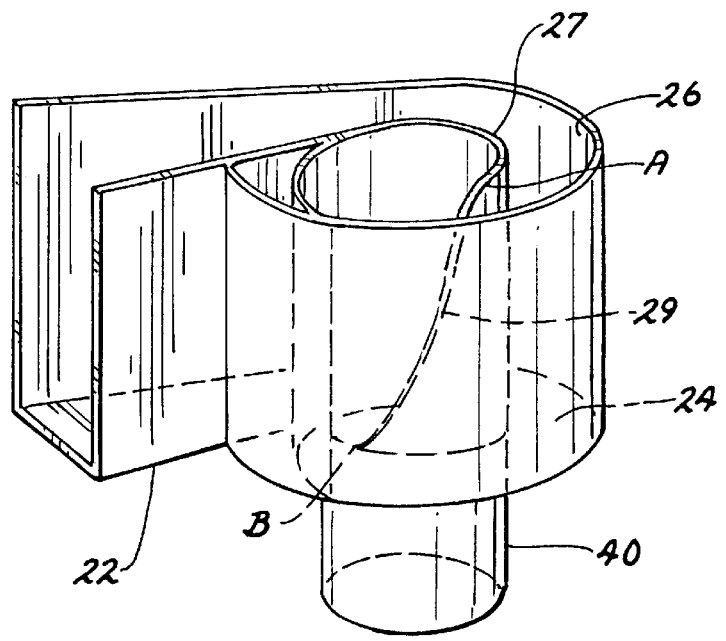
FIG. 6 is a perspective view of one embodiment of the vortex form.

To allow the sewage flow to enter the conduit 40, inner wall 27 must include a height transition section 29 (identified on FIGS. 2, 4, and 6 as section A–B) which allows the sewage flow to enter the conduit 40. It is envisioned that this transition section could take many forms, including a sharp vertical cut or a gradual decrease in wall height. It has been found to be advantageous, however, to fabricate inner wall 27 such that its height profile reflects an axial flow velocity distribution. This type of cut is illustrated in FIG. 6.

Referring again to FIG. 1, conduit 40 is disposed within maintenance hole 30 and fluidly connected to vortex channel 24. Conduit 40 comprises a pipe wall 45 having a radius smaller than maintenance hole 30 and extending substantially downwardly from vortex form 20. Conduit 40 further comprises a base 46, and a flow exit path 50 near said maintenance hole base. The upper portion of the pipe wall 45 may be constructed integrally with inner wall 27.

Still referring to FIG. 1, the sewage spirals and falls from vortex channel 24 into conduit 40, along the inner surface 47 of pipe wall 45. This flow continues to descend along the inner surface 47 of pipe wall 45 in a substantially spiral fashion until the sewage nears the conduit base 46. The conduit base 46 is disposed below the surface of the energy dissipating pool 72 and at or above the base 34 of the maintenance hole 30 to create a flow exit path 50. The sewage flow accumulates in the conduit base where it eventually flows through the flow exit path 50, located at or near the conduit base 46, into the energy dissipating pool 72 near the bottom of the maintenance hole 30.

The flow exit path 50 may comprise any structure that allows the sewage flow to exit the conduit 40 at a predetermined flow rate. One example of a flow exit path is shown in FIG. 1, comprising a portal 56 in the conduit base 46. The portal 56 allows the sewage flow that has accumulated in the conduit base 46 to exit into the energy dissipating pool 72. Additional embodiments of the flow exit path 50 are shown in FIGS. 3 and 4. In FIG. 3, the flow exit path 50 comprises a plurality of legs 52 connected to and supporting the conduit base 46. The plurality of legs 52 are themselves supported by the maintenance hole base 34. The plurality of legs 52 allows the sewage flow within the conduit base 46 to be fluidly connected to the energy dissipating pool 72 and allows the sewage flow to exit the conduit base 46 at a predetermined flow rate. In FIG. 4, the flow exit path 50 comprises a suspended conduit support 80. The suspended conduit support 80 includes a conduit anchor 82 and a vortex form base support 84. The vortex form base support 84 is connected to both the maintenance hole side wall 36 and the maintenance hole base 34, and supports the vortex form 20 and conduit 40 in a suspended fashion. The conduit anchor 82, comprising a rigid structure capable of securing the conduit 40, is connected to the maintenance hole side wall 36 and provides horizontal support for the conduit 40. The conduit support 80 allows the conduit 40 to be suspended above the maintenance hole base 34, thus allowing the sewage flow to exit the conduit 40 at the conduit base 46 and enter the energy dissipating pool 72.

Once the flow has reached the energy dissipating pool 72, it may be drawn away for further transport though an effluent line 60, as shown in FIG. 1. In another embodiment, shown in FIG. 4, the sewage flow may be drawn into a treatment pool 62 for further treatment.

As illustrated in FIG. 3, the present invention may utilize an air relief 70 to equalize substantially the air pressure within the maintenance hole 30 above the vortex form 20 with the air pressure within the maintenance hole 30 below the vortex form 20 and within the effluent line 60. Air relief 70 comprises a pipe connecting the top portion of the effluent line 60 with the maintenance hole 30 above the vortex form 20. The air relief 70 substantially equalizes the air pressures in the upper influent line 12 and the lower effluent line 60, drawing the air from the higher pressure influent line 12 downward to the lower pressure effluent line 60. This pressure equalization, by drawing the air through the air relief 70 into the effluent line 60, further prevents the leakage of noxious gases not absorbed by the sewage flow within the maintenance hole 30. These gases, dragged by the influent flow and not consumed by the spiral flow, would otherwise rise and emit from the improved sewer apparatus into the neighborhood. As illustrated in FIG. 5, in another embodiment the air relief 70 comprises a pipe extending through the vortex form, providing a path for the air to travel from the higher pressure area above the vortex form 20 to the lower pressure area below the vortex form 20. The air relief 70 of this embodiment acts in the same fashion as the previously described embodiment to prevent the leakage of noxious gases not absorbed by the sewage flow within the maintenance hole 30.

Referring to the embodiment illustrated in FIG. 1, in operation, incoming sewage at a small slope enters the vortex form 20 at the entrance flume 22 and descends through the vortex channel 24. The supercritical slope of the entrance flume 22 and the vortex channel 24 provides rising flow velocities with a partial potential energy transition into kinetic energy. Even though sewage flow encounters a narrowing of the cross-section of the entrance flume 22, the water level generally does not rise due to the flow acceleration created by the supercritical slope of the base 21. The flow is then directed within the vortex channel 24 by the radius transition section 28 and the height reduction section 29 of the inner wall 27 into a smaller radius conduit 40.

The sewage flow then spirals downwardly against the inside wall of the conduit 40, creating a low pressure air core running longitudinally in the center of the conduit 40. The low pressure air core draws air from the maintenance hole 30 above the vortex form 20 into the conduit 40. Some of the oxygen in the air core mixes with and becomes entrained in the sewage flow, reacting with the potentially volatile dissolved hydrogen sulfide gas ($H_2S$) in the liquid sewage to produce hydrogen sulfate ($H_2SO_4$) in the solution. This reaction prevents hydrogen sulfide gas from being released into the air and then onto sewer surfaces where corrosion can occur or into the above ground neighborhood as a foul gas. The conduit 40 also helps to dissipate the high velocities and kinetic energy of the sewage flow by friction between the descending spiral flow and the conduit wall 45. This energy reduction through friction reduces flow turbulence and thus hydrogen sulfide gas emission from the waste water liquid into the surrounding air. Without losing the flow's integrity, the gravity flow is transformed into a flow with combined gravity and centrifugal forces.

The sewage flow completes its downward spiral near the conduit base 46, where the most intensive processes of flow mixing and aeration occur. The sewage air-flow mixture then flows out of the conduit base 46 through a flow exit 50 into an energy dissipating pool 72 for further internal mixing and friction. At the top surface of the energy dissipating pool 72 is a generally tranquil flow that leaves the maintenance hole 30 via the effluent line 60.

Figure 7:
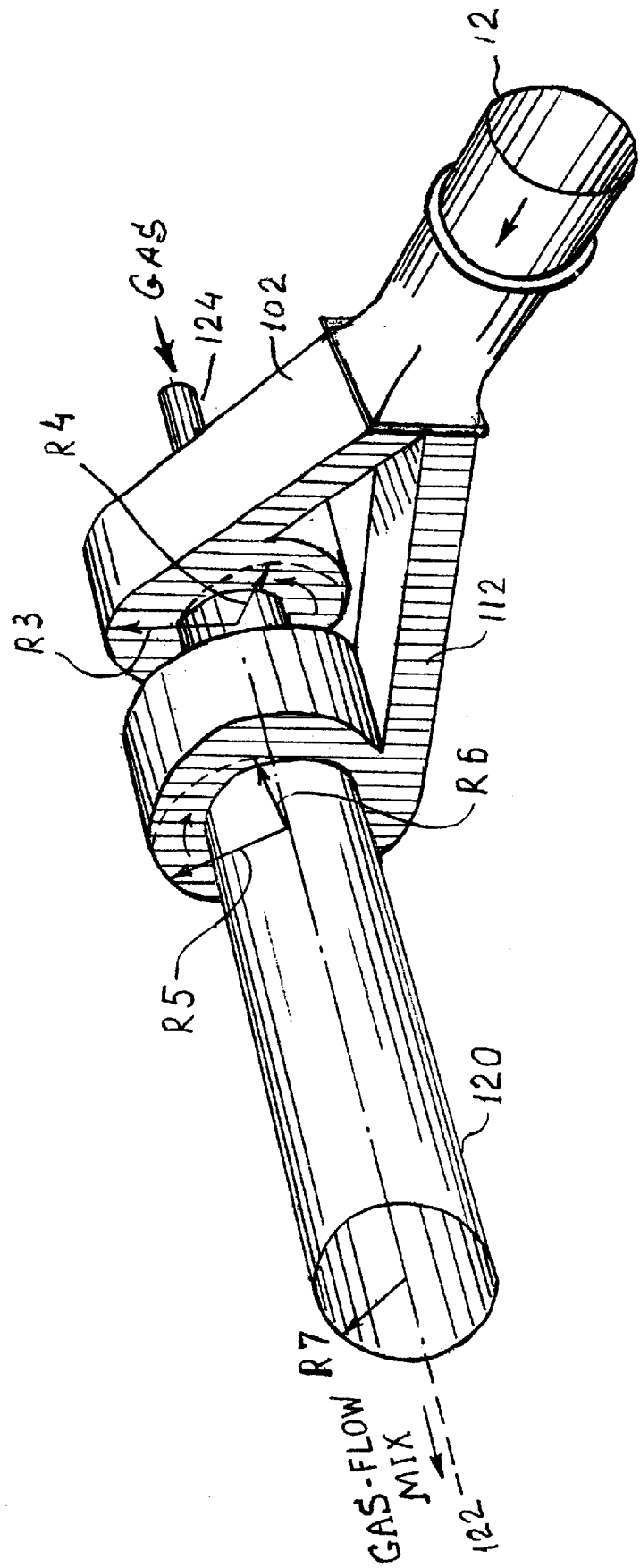
FIG. 7 is a perspective view of another embodiment of the present invention using two vortex forms from a single influent line.
Figure 8:
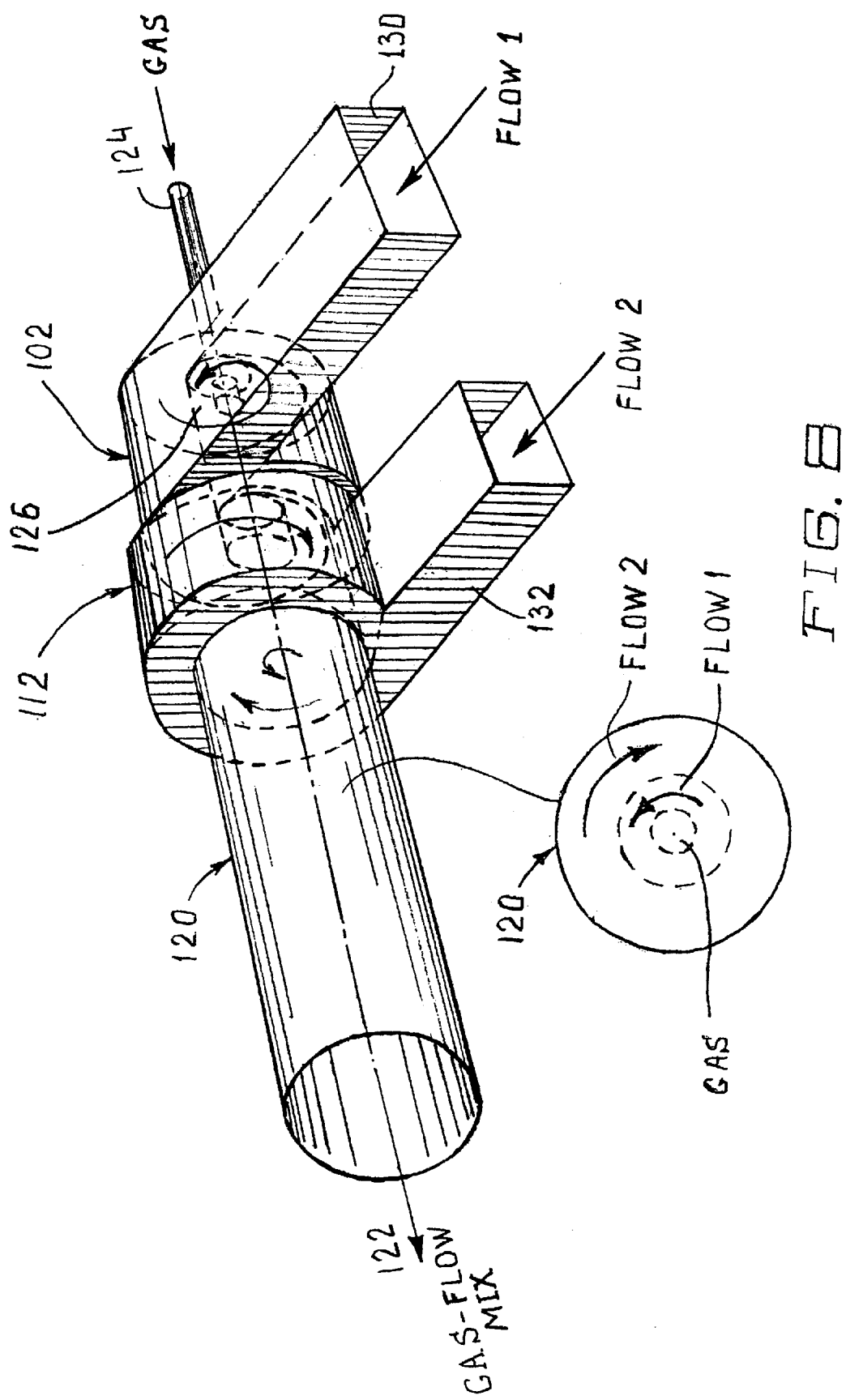
FIG. 8 is a perspective view of another embodiment of the present invention using two vortex forms from two influent lines.

As shown in FIGS. 7 and 8, other embodiments of the invention can also be used to mix and entrain gas in fluid flow within a conduit 120. In FIG. 7, flow is channeled through influent line 12 into separate vortex forms 102 and 112. Influent line 12 is generally a cylindrical pipe, but can take any cross-sectional shape. Depending upon the flow acceleration desired in the vortex forms 102 and 112, the influent line 12 and the vortex forms 102 and 112 can be oriented at a variety of slopes. In addition, fluid flow pumps (not shown), known in the prior art, can be utilized to accelerate the flow within the influent line 12. In FIG. 7, the influent line 12 is shown substantially horizontal.

The influent line 12 is fluidly connected to both vortex forms 102 and 112. Each vortex form 102 and 112 is positioned to receive a portion of the flow from influent line 12 and each is generally shaped to create a spiral flow about the centerline 122 of conduit 120. Vortex form 112 is positioned proximate to and downstream of vortex form 102. In practice, it is beneficial to direct the spiral flow of vortex form 112 in a direction opposing the spiral flow created in vortex form 102. As described in the previous embodiments, the vortex form 102 directs the fluid into a spiral of a predetermined radius (shown as R3) greater than the radius (shown as R7) of the conduit 120 and subsequently reduces the radius of the spiral flow (shown as R4) to be equal to or less than radius R7 of the conduit 120 to increase the centrifugal forces acting upon the fluid. Vortex form 112 directs the flow in a similar manner, creating spiral flow of predetermined radius (shown as R5) and reducing the radius of a that spiral flow (shown as R6).

Conduit 120 is fluidly connected to vortex forms 102 and 112 and extends downstream away from the vortex forms 102 and 112. The downstream extension of conduit 120 may be oriented in any position from substantially horizontal to downwardly vertical, depending upon the application. Conduit 120 may also extend upstream of vortex form 102. Conduit 120 includes an air intake 124 upstream of vortex form 102 that allows air or other gases to enter into conduit 120 and mix with flows delivered by vortex forms 102 and 112 within conduit 120. In FIG. 7, the air intake 124 is a pipe, but could in other embodiments take any form allowing the flow of air or gases into the conduit 120 upstream of vortex form 102. The spiral flows created by vortex forms 102 and 112 create a column of air or gas that is drawn through the air intake 124 and causes a portion of the air or gas to mix with and become entrained in the fluid flow. The conduit 120 must extend far enough downstream to allow such mixing and entrainment.

The embodiment in FIG. 8 also uses vortex forms 102 and 112 to create two spiral flows. However, in FIG. 8, each vortex form 102 and 112 receives fluid from separate influent lines 130 and 132. The influent lines 130 and 132 may deliver the same or different fluids, and the densities of each fluid may differ. Conduit 126 is disposed within conduit 120 about centerline 122, and receives flow from vortex form 102. Conduit 126 can be formed separate from or integral with vortex form 102. Conduit 126 ends proximate to vortex form 112. Gas mixes with the spiral flow from vortex form 102 within conduit 126. The spiral flow and gas within conduit 126 then empty into conduit 120 and mix with the spiral flow created by vortex form 112. It is again beneficial to direct the spiral flows from vortex forms 102 and 112 in opposing directions to enhance the mixing and entrainment of the gas and fluids.

This description is intended to provide specific examples of individual embodiments which clearly disclose the present invention. By way of example only, and without limitation, the present invention could find use in drop structures having other than a circular or cylindrical configuration, thus freeing designers to construct such structures according to need. This invention can also be used in non-sewer applications where one seeks to mix gas and fluid within a conduit. Accordingly, the invention is not limited to the described embodiments, or to the use of the specific elements described therein. All alternative modifications and variations of the present invention which fall within the spirit and broad scope of the appended claims are covered.

What is claimed is:

1. A method for reducing gas emissions from fluid traveling through drop structures having a wall and a base, said method comprising:

channeling the fluid within the drop structure into a spiral flow of predetermined radius;

reducing said spiral flow predetermined radius to increase the centrifugal forces acting upon the fluid; and continuing said reduced radius spiral flow, with the aid of gravity, to or near the drop structure base.

2. The method of claim 1, further comprising:

providing air access to the drop structure to allow mixing of the air with said spiral flow.

3. A method for entraining and mixing air or another gas with liquid traveling within a conduit, said method comprising:

channeling a first portion of the liquid within a first influent line into a first spiral flow of first predetermined radius around the centerline of said conduit;

channeling a second portion of the liquid within said first influent line into a second spiral flow of second predetermined radius around said centerline of said conduit downstream of said first spiral flow and having a rotational direction opposing said first spiral flow;

reducing each of said first and second spiral flows predetermined radii to increase the centrifugal forces acting upon each of said spiral flows; and providing air or other gas access to said conduit upstream of and proximate to said first spiral flow so that the a portion of the air or other gas mixes with and becomes entrained in said spiral flows.

4. The method of claim 3, including a second influent line, wherein said first and second spiral flows are channeled from said first and second influent lines, respectively.

5. The method of claim 4, wherein the said air or gas access is provided though a pipe centered about said centerline of said conduit.

6. The method of claim 4, wherein said first spiral flow predetermined radius is reduced to a smaller radius than said second spiral flow predetermined reduced radius.

7. The method of claim 3, further comprising:

channeling a first portion of a second liquid within a third influent line into a third spiral flow of third predetermined radius around the centerline of said conduit and downstream of said first and second spiral flows;

channeling a second portion of the second liquid within said third influent line into a fourth spiral flow of fourth predetermined radius around said centerline of said conduit downstream of said third spiral flow and having a rotational direction opposing said third spiral flow; and reducing each of said third and fourth spiral flows predetermined radii to increase the centrifugal forces acting upon each of said spiral flows;

so that said third and fourth spiral flows mix with said first and second spiral flows.

8. The method of claim 7, further comprising:

channeling additional liquid or liquids within a one or more additional influent lines into additional spiral flows of predetermined radii around the centerline of said conduit and downstream of said first and second spiral flows; and reducing each of said additional spiral flows predetermined radii to increase the centrifugal forces acting upon each of said additional spiral flows;

so that said additional spiral flows mix with said first and second spiral flows.

9. A method for entraining and mixing air or another gas with liquid traveling within a conduit, said method comprising:

channeling a first portion of the liquid within a first influent line into a first spiral flow of first predetermined radius around the centerline of said conduit;

channeling a second portion of the liquid within said first influent line into a second spiral flow of second predetermined radius around said centerline of said conduit downstream of said first spiral flow and having the same rotational direction as said first spiral flow;

reducing each of said first and second spiral flows predetermined radii to increase the centrifugal forces acting upon each of said spiral flows; and providing air or other gas access to said conduit upstream of and proximate to said first spiral flow so that the a portion of the air or other gas mixes with and becomes entrained in said spiral flows.

10. The method of claim 9, including a second influent line, wherein said first and second spiral flows are channeled from said first and second influent lines, respectively.

11. The method of claim 10, wherein the said air or gas access is provided though a pipe centered about said centerline of said conduit.

12. The method of claim 10, wherein said first spiral flow predetermined radius is reduced to a smaller radius than said second spiral flow predetermined reduced radius.

13. The method of claim 9, further comprising:

channeling a first portion of a second liquid within a third influent line into a third spiral flow of third predetermined radius around the centerline of said conduit and downstream of said first and second spiral flows;

channeling a second portion of the second liquid within said third influent line into a fourth spiral flow of fourth predetermined radius around said centerline of said conduit downstream of said third spiral flow and having the same rotational direction as said third spiral flow; and reducing each of said third and fourth spiral flows predetermined radii to increase the centrifugal forces acting upon each of said spiral flows;

so that said third and fourth spiral flows mix with said first and second spiral flows.

14. The method of claim 13, further comprising:

channeling additional liquid or liquids within a one or more additional influent lines into additional spiral flows of predetermined radii around the centerline of said conduit and downstream of said first and second spiral flows; and reducing each of said additional spiral flows predetermined radii to increase the centrifugal forces acting upon each of said additional spiral flows;

so that said additional spiral flows mix with said first and second spiral flows.

* * * * *